United States Patent [19]

Aoki et al.

[11] Patent Number: 5,282,241
[45] Date of Patent: Jan. 25, 1994

[54] MODEM POOLING SYSTEM

[75] Inventors: Takashi Aoki; Yoshikazu Sano, both of Hino, Japan

[73] Assignee: Kabushiki Kaisha Toshiba, Kawasaki, Japan

[21] Appl. No.: 674,953

[22] Filed: Mar. 26, 1991

[30] Foreign Application Priority Data

Mar. 26, 1990 [JP] Japan ................................. 2-76281

[51] Int. Cl.$^5$ .......................................... H04M 11/00
[52] U.S. Cl. ...................................... 379/98; 375/121
[58] Field of Search ........................ 379/93, 97–99, 379/441–443, 156, 165, 164; 375/8, 121

[56]    References Cited
U.S. PATENT DOCUMENTS

| 4,564,724 | 1/1986 | Nakayama et al. | 379/164 |
| 4,622,685 | 11/1986 | Dhawan et al. | 375/8 |
| 5,109,406 | 4/1992 | Mano et al. | 379/93 |

Primary Examiner—Wing F. Chan
Attorney, Agent, or Firm—Foley & Lardner

[57]    ABSTRACT

In a modem pooling system for enabling selective connection of a plurality of data terminal units $5_1$ to $5n$ to a modem 9 through an exchange switch 17, when the modem 9 is in standby state, the exchange switch 17 is controlled so that the modem 9 is continuously connected to a data terminal unit (e.g. $5_1$) selected in advance as a responsive data unit terminal from among the data terminal units.

5 Claims, 11 Drawing Sheets

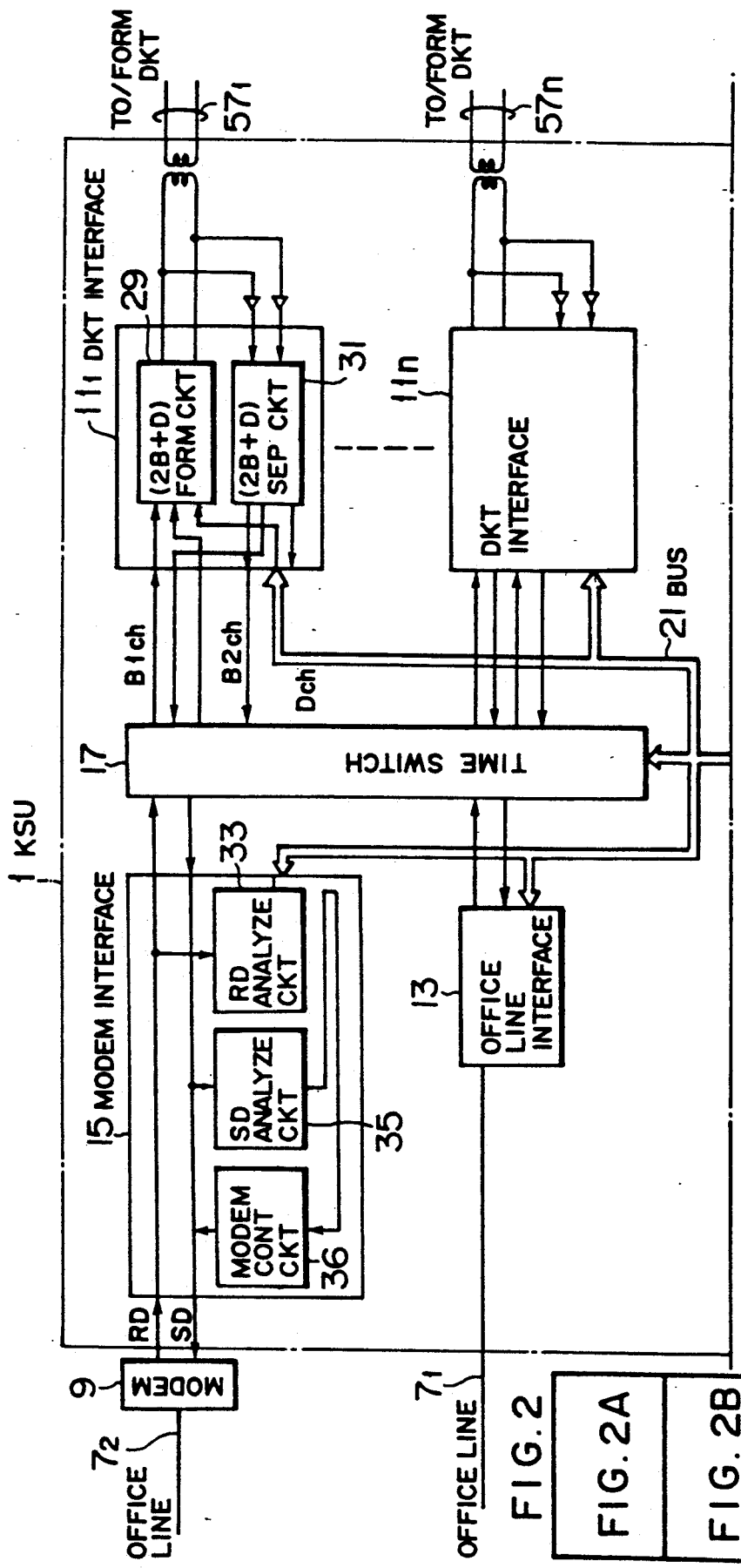

MODEM POOLING SYSTEM

BACKGROUND OF THE INVENTION

The present invention relates to a modem pooling system for enabling selective connection of a plurality of data terminal units to a modem through exchange service.

A modem is mainly used to connect a data terminal unit to an analog line such as a public telephone line. The modem pooling system is a system for enabling a number of data terminal units to get access to an analog line by use of a few modems, and practically realized in a digital key telephone system, for instance.

In the digital key telephone system of this type, conventionally, at least one modem is connected to a key service unit including an exchange circuit via an interface (e.g. RS-232C), and further an analog office line is connected to the modem. Further, a plurality of extension key telephone sets connected to the key service unit are provided with each interface unit (e.g. RS-232C) respectively, through which each personal computer is connected, as a data terminal unit, to each extension key telephone set.

In the conventional system, when an incoming call arrives at the modem through the office line, the incoming call signal is first transmitted from the modem to a control unit in the key service unit. In response to this signal, the control unit controls a switching circuit for exchange service to connect the modem to a data terminal unit, and further indicates the incoming call arrival to the data terminal unit. In response to the incoming call information, the data terminal unit starts data communication with the office line.

In the conventional system, however, where an automatic responsive modem is used, there exists a problem in that when the control unit is getting access to the data terminal unit to be called, the modem responds to an incoming call signal, so that before the modem is connected to the data terminal unit, data are transmitted from the office line to the modem and therefore the head portion of the transmitted data cannot be received by the data terminal unit.

In more detail, the automatic responsive modem usually responds automatically to an incoming call signal arrival by an independent control unit incorporated in the modem, after a predetermined time has elapsed, irrespective of the operation of the key service unit. However, when the control unit in the key service unit is under overload conditions (the state where a plurality of outgoing or incoming call signals are generated simultaneously and therefore each control processing is delayed momentarily), since the exchange service is delayed from the automatic response of the modem, the head portion of the data inputted from the modem to the key service unit will not be transmitted to the data terminal unit.

SUMMARY OF THE INVENTION

The object of the present invention is to provide a modem pooling system which can prevent the head portion of data to be received by the data terminal unit via the modem from being omitted, even when an automatic responsive modem is incorporated in the system.

To achieve the above-mentioned object, the present invention provides a modem pooling system for enabling selective connection of a plurality of data terminal units to a modem through exchange service means, comprising: modem state detecting means for detecting standby state of the modem; and exchange service control means for controlling the exchange service means so that the modem is continuously connected to a predetermined data terminal unit selected as a responsive terminal unit from among the data terminal units, while said modem state detecting means is indicating that the modem is in standby state.

BRIEF DESCRIPTION OF THE DRAWINGS

FIGS. 2A-2C are block diagrams showing a key service unit of the system shown in FIG. 1;

DESCRIPTION OF THE PREFERRED EMBODIMENTS

An embodiment of the present invention will be described hereinbelow with reference to the attached drawings.

Figure 1:
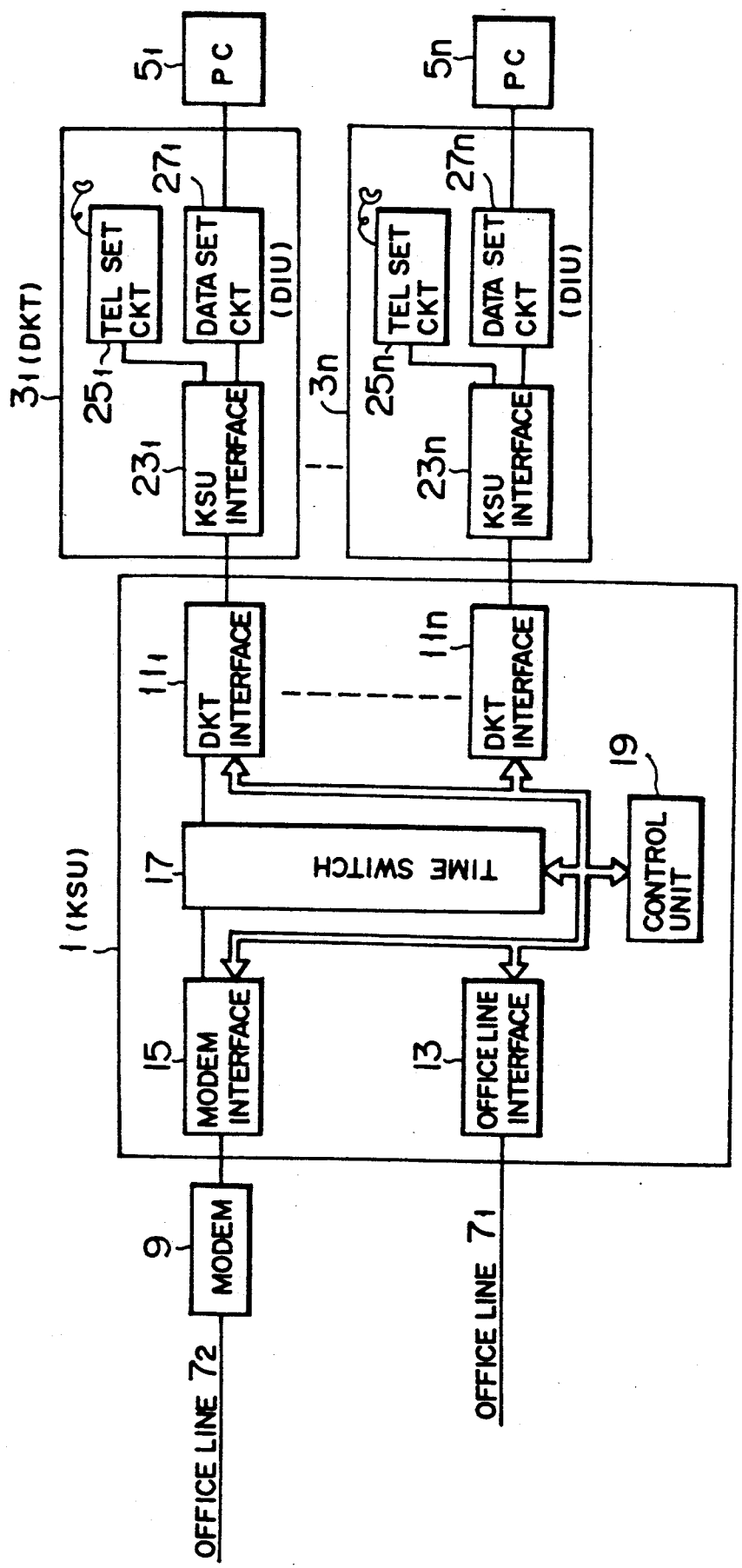
FIG. 1 is a system block diagram showing an embodiment of the modem pooling system according to the present invention.

FIG. 1 is a block diagram showing an embodiment of the modem pooling system according to the present invention, in which a digital key telephone system is shown by way of example.

In this system, a plurality (n) of digital key telephone sets (DKT) $3_1$ to $3_n$ are connected to a key service unit (KSU) provided with exchange and control service functions, and further a plurality (n) of personal computers (PC) $5_1$ to $5_n$ are connected to the digital key telephone sets (DKT), respectively. An analog office line $7_1$ and a modem 9 are connected to the key service unit 1. Another office line $7_2$ is connected to the modem 9. Each personal computer $5_1$ to $5_n$ have access to the office line $7_2$ via the modem 9. Further, the interface between the modem 9 and the key service unit 1 is RS-232C.

The key service unit 1 includes a plurality of digital key telephone set (DKT) interface units $11_1$ to $11_n$ connected to the digital key telephone sets $3_1$ to $3_n$, an office line interface unit 13 connected to the office line $7_1$, and a modem interface unit 15 connected to the modem 9. All of these interface units are connected to a time switch 17 for controlling exchange service between these interface units. Hereinafter, data transmission from the time switch 17 to these interface units is referred to as "down-stream data transmission" and data transmission in the opposite direction is referred to as "up-stream data transmission". Further, these interface units and the time switch 17 are connected to the control unit 19 for controlling the system operation, via a control data bus 21.

The digital key telephone set 3 includes a key service unit (KSU) interface unit 23 connected to the DKT interface unit 11 in the key service unit 1, a telephone set circuit 25 having a speech network, a dial circuit, a handset, etc. to enable various key telephone set functions, and a data terminal unit interface unit 27 connected to the data terminal unit 5. Data are ping-pong transmitted between the KSU interface unit 23 and the DKT interface unit 11 via (2B+D) time-division channel, for instance. In more detail, data packets obtained through two time-division signal channels B1 and B2 and a time-division data channel D in combination are transmitted between the KSU interface unit 23 and the DKT interface unit 11. The B1 channel is used to transmit speech data when the key telephone set 3 is in speech operation, and the B2 channel is used to transmit data when the personal computer is in data communication operation. On the other hand, the D channel is used to transmit various control commands (to control various operations such as incoming call, outgoing call, response, interrupt and restart of data communications, speech end, etc.) and result codes. Data transmitted through B channel is referred to as "communication data", and data transmitted through D channel is referred to as "control data", hereinafter.

Figure 2B:
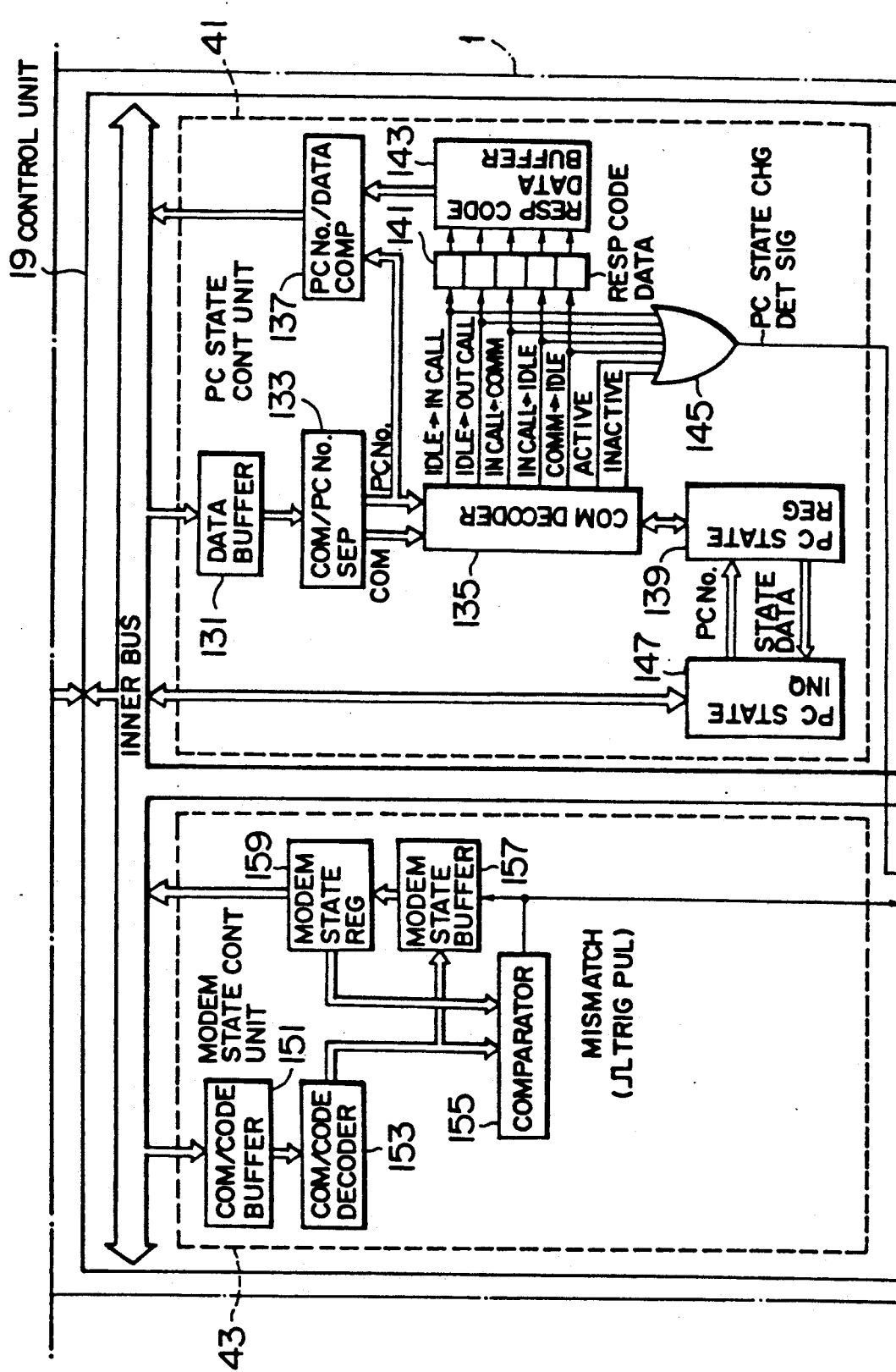
Figure 2C:
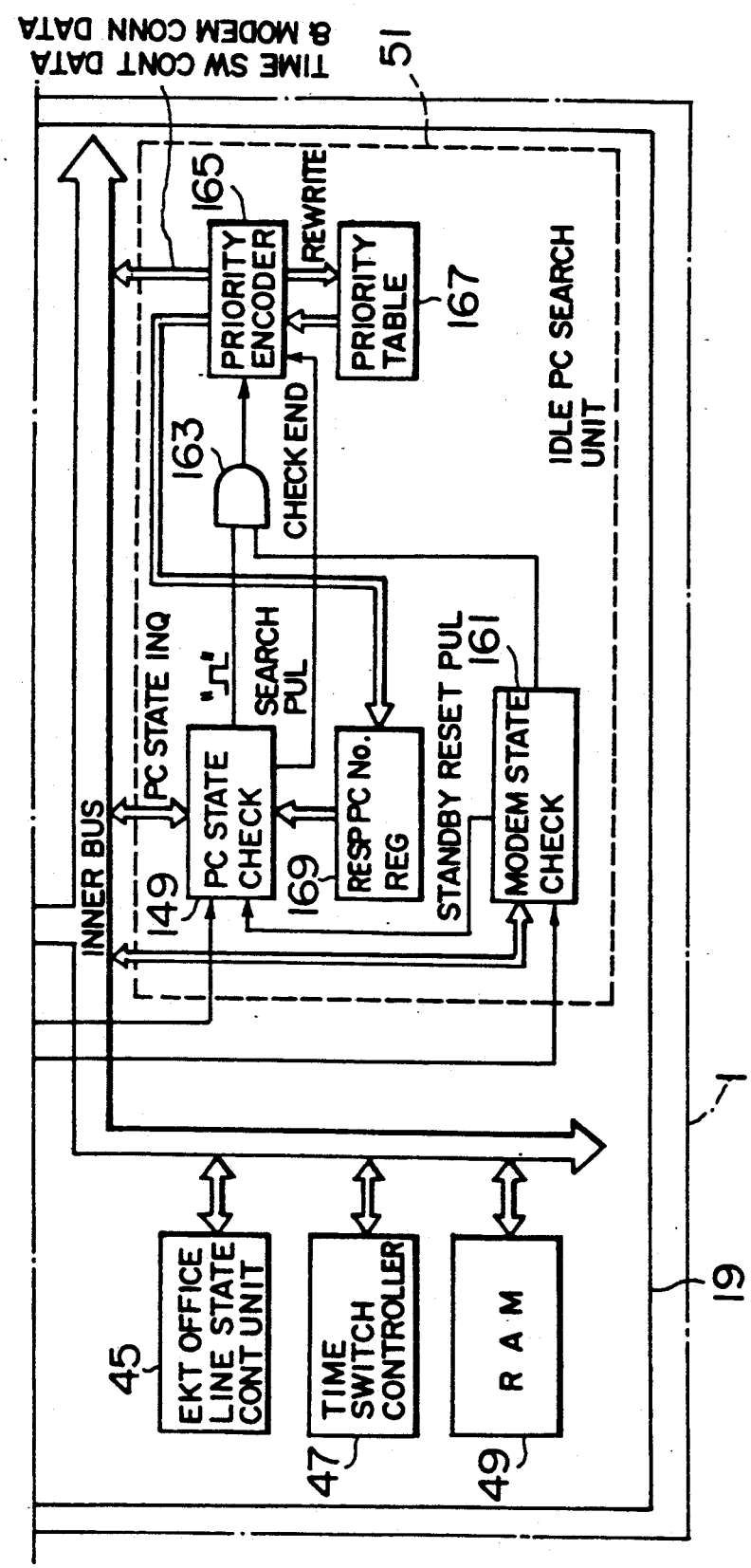

FIGS. 2A-2C show each section of the key service unit 1. The DKT interface unit 11 includes a (2B+D) forming circuit 29 and a (2B+D) separating circuit $3_1$. The (2B+D) forming circuit 29 receives communication data from two designated down-stream time slots outputted from the time switch 17 and control data from the control unit 19 via the bus 21, and forms (2B+D) data packets by multiplexing these data to transmit data to the key telephone set 3. Further, the (2B+D) separating circuit 31 receives the (2B+D) data packets from the key telephone set 3, separates the data for each channel, transmits the separated communication data to two designated up-stream time slots inputted to the time switch 17 and the separated control data to the control unit 19 via the bus 21. The transmission of the (2B+D) forming circuit 29 and the reception of the (2B+D) separating circuit $3_1$ are executed independently in time division mode.

The modem interface unit 15 is an interface equivalent to so-called three-wire RS-232C interface. That is, this modem interface unit 15 receives data from the modem 9 via the RD line and transmits the received data to one designated down-stream time slot of the time switch 17, and further receives data from one designated up-stream time slot of the time switch 17 and transmits the received data to the modem 9 via the SD line. This modem interface unit 15 includes an RD analyzing circuit 33 and a SD analyzing circuit 35. These analyzing circuits 33 and 35 monitor and analyze data (RD and SD) transmitted between the modem 9 and the time switch 17 via the interface unit 15, and transmit control data corresponding to the results to the control unit 19 via the bus 21. Further, a modem control circuit 36 receives control data from the control unit 19 and transmits control commands corresponding thereto to the modem 9, while having access to the control unit 19 to check the presence or absence of carriers required for control.

The office line interface unit 13 is provided with various functions such as detection function of outgoing and incoming call signals to and from the office line $7_1$, transmission function of communication data between the office line 71 and the time switch 17, etc. The office line interface unit 13 is so selected as to be applicable to the sort of the office lines $7_1$ (e.g. analog office line, INDN office line, etc.). In the case of ISDN (integrated service digital network) office line, (2B+D) forming circuit and (2B+D) separating circuit both similar to those provided in the DKT interface unit 29 are incorporated in the office line interface unit 13.

The control unit 19 includes a PC state control unit 41, a modem state control unit 43, a DKT/office line state control unit 45, a time switch controller 47, a RAM 49, and an idle PC search unit $5_1$. The PC state control unit 41 monitors the states (e.g. standby, incoming call, data communication, etc.) of the personal computers $5_1$ to $5_n$ on the basis of control data given by the DKT interface units $11_1$ to $11_n$, and transmits control data to the DKT interface units $11_1$ to $11_n$ to control the personal computers $5_1$ to $5_n$. The modem state control unit 43 monitors the state of the modem 9 on the basis of the control data given by the modem interface unit 15, and transmits necessary control data to the modem interface unit 15. The DKT/office line state control unit 43 monitors and controls the states of the key telephone sets $3_1$ to $3_n$ and the office line $7_1$ by transmitting control data between the DKT interface units $11_1$ to $11_n$ and the office line interface unit 13. The states of the personal computers, modem, key telephone sets and office line $7_1$ are all stored in a state table in a RAM 49.

The time switch controller 47 controls the time switch 17 according to the state of each terminal unit and office line to connect/disconnect the communication path.

Further, the control unit 19 includes a PC search unit 51. This PC search unit 51 refers to a state table in a RAM 49 to select a single personal computer now being in standby state. The selected computer is designated as a personal computer in charge of response to an incoming call given through the office line $7_2$ (referred to as a responsive PC, hereinafter).

When a responsive PC has been decided, the information is given to the time switch controller 47, so that the time switch controller 47 keeps the connection between the modem and the responsive PC. Therefore, when an incoming call signal arrives at the modem 9 via the office line $7_2$, since the modem 9 has already been connected to the responsive PC, no exchange service is required; that is, the data inputted through the office line $7_2$ can be immediately received by the responsive PC. The configuration of the control unit 19 will be described in detail later.

Figure 3:
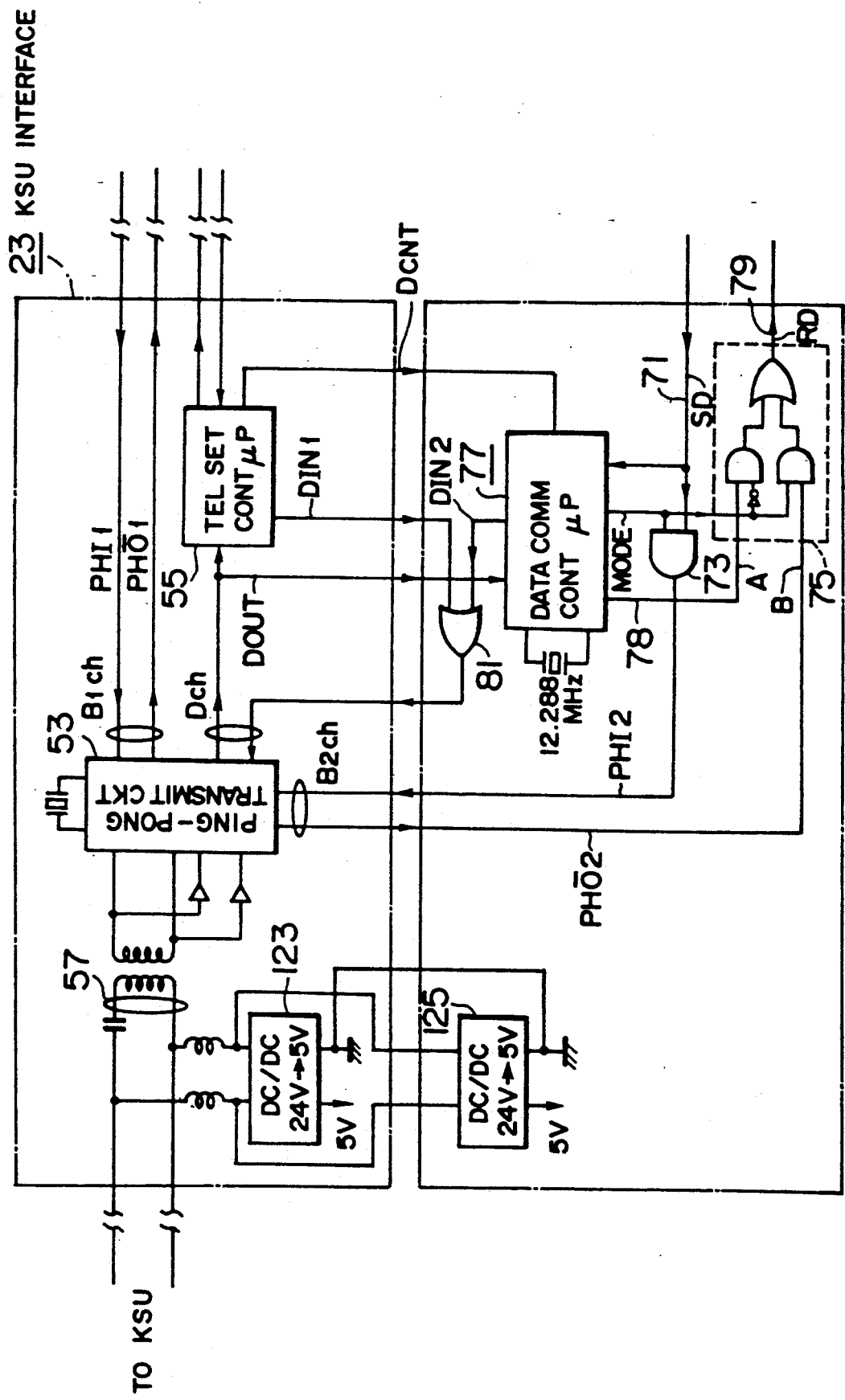
FIG. 3 is a block diagram showing the configuration of a key service unit interface unit and a data terminal interface unit in a digital key telephone set of the system shown in FIG. 1.

FIG. 3 shows a detailed configuration of the KSU interface unit 23 and the data terminal interface unit 27 both incorporated in the digital key telephone set 3.

Figure 4:
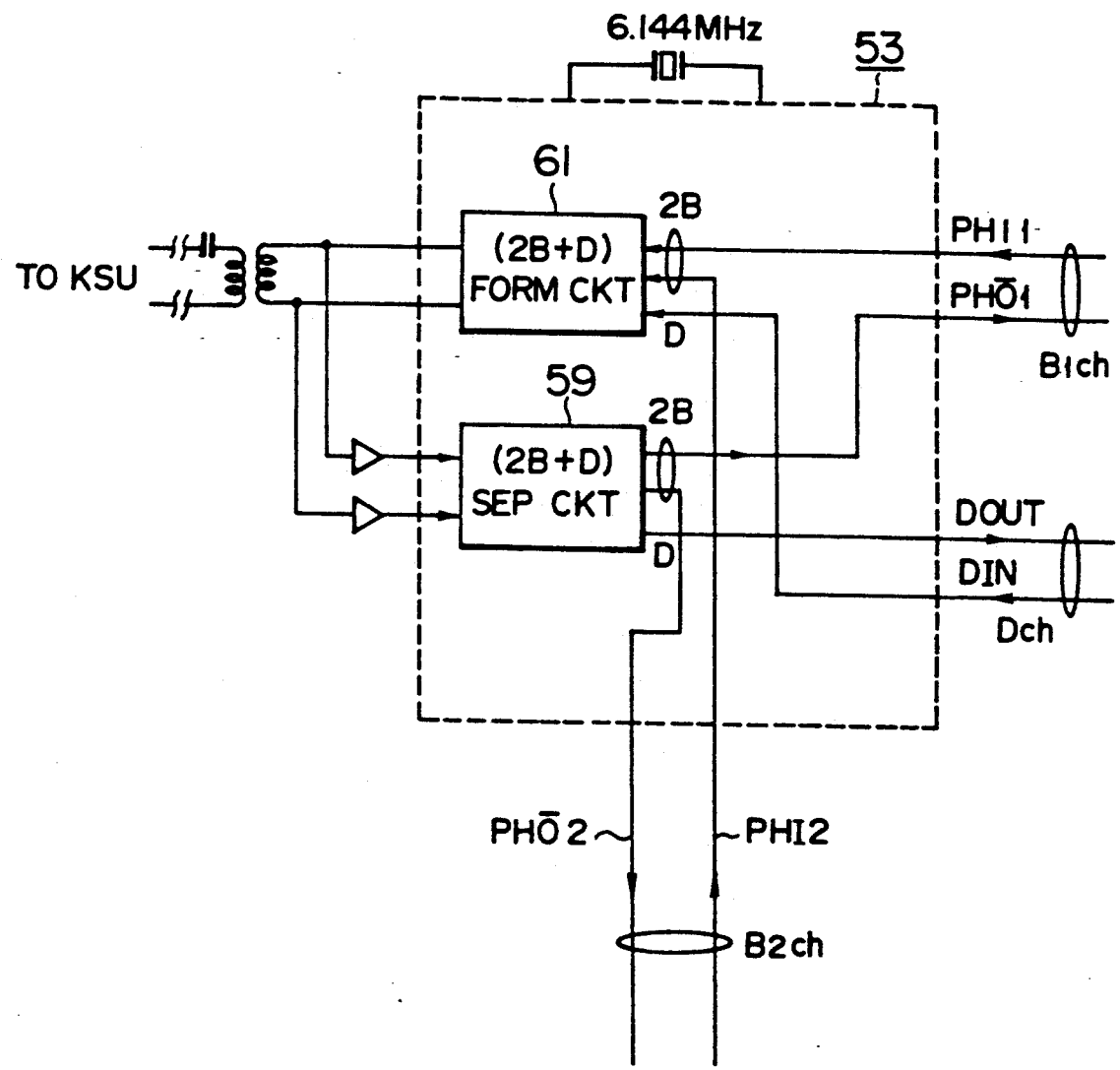
FIG. 4 is a block diagram showing a ping-pong transmission circuit provided in the key service unit interface shown in FIG. 3.

The KSU interface unit 23 includes a ping-pong transmission circuit 53 and a telephone set control microprocessor 55. The ping-pong transmission circuit 55 is connected to the DKT interface unit 11 of the key service unit 1 via a two-wire signal line 57, and provided with a (2B+D) separating circuit 59 and a (2B+D) forming circuit 61 as shown in FIG. 4. The (2B+D) separating circuit 59 receives down-stream packets from the key service unit 1, separates the received data packet into down-stream data PHO1, PHO2 and DOUT for each channel, and outputs these data. The outputted B1-channel down-stream communication (speech) data PHO1 are transmitted to the telephone set circuit 25; the B2-channel down-stream communication data are transmitted to the data terminal interface unit 27; and the down-stream control data are transmitted to the telephone set circuit control microprocessor 55 and the data terminal interface unit 27. Further, B1-channel up-stream communication (speech) data HI1 are inputted from the telephone set circuit 25 to the ping-pong transmission circuit 53; and B2-channel up-stream communication data PHI2 and up-stream control data DIN are inputted from the data terminal interface unit 27 to the transmission circuit 53. These up-stream data PHI1, PHI2 and DIN are multiplexed into the up-stream (2B+D) packet by the (2B+D) forming circuit 61, and then transmitted to the key service unit 1 via the signal line 57. The down-stream packet reception and the up-stream packet transmission are executed independently in time division manner.

Figure 5:
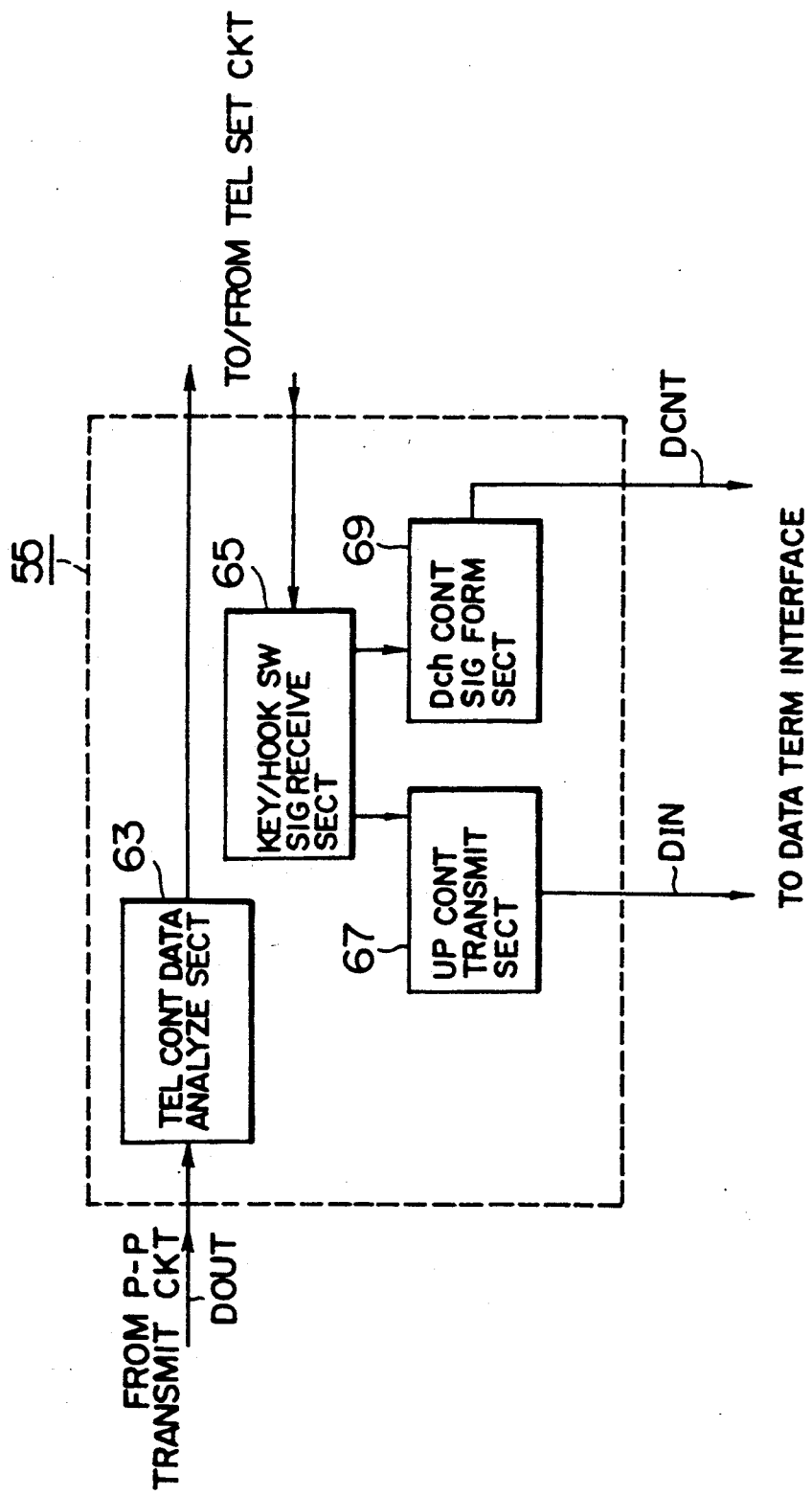
FIG. 5 is a block diagram showing a microprocessor for controlling a telephone set, which is provided in the key service unit interface shown in FIG. 3.

The telephone set control microprocessor 55 controls the operation of the telephone set circuit 25. This microprocessor 55 includes a telephone set control data analyzing section 63, a key/hook switch signal receiving section 65, an up-stream control data transmitting section 67, and a D-channel control signal forming section 69, as shown in FIG. 5. The telephone set control data analyzing section 63 receives down-stream control data DOUT from the ping-pong transmission circuit 53, analyzes the control data (if DOUT are data for controlling the corresponding key telephone set), and transmits control signals to the telephone set circuit 25 in order to turn on a display LED, generate a call tone, etc. according to the analyzed result. The key/hook switch signal receiving section 65 receives key signals (generated when dial keys or function keys of the key telephone set are depressed) and hook signals indicative of handset on/off hook transmitted from the telephone set circuit 25, forms control data corresponding to the received signals, and transmits the formed control data to the up-stream control data transmitting section 67. The up-stream control data transmitting section 67 transmits the received control data to the data terminal interface unit 27 as the first up-stream control data DIN 1.

Further, the key/hook switch signal receiving section 65 gives an information signal indicative of the presence or absence of signals inputted from the telephone set circuit 25, to the D-channel control signal forming section 69. On the basis of the information signal, the D-channel control signal forming section 69 forms a D-channel control signal DCNT ("H" if the signal is inputted but "L" if not inputted), and gives it to the data terminal interface unit 27.

As described later, the D-channel control signal DCNT controls the control data transmission from the data terminal interface unit 27 to the D-channel.

The data terminal interface unit 27 will be explained hereinbelow. As shown in FIG. 3, the data terminal interface unit 27 formed of RS-232C interface is connected to the personal computer 5 via three lines (SD, RD and SG) (SG line is not shown). Data SD transmitted from the personal computer 5 are inputted to the data terminal interface unit 27 via the SD line $7_1$, irrespective of communication data or control data. The transmitted data SD are inputted to a data communication control microprocessor 77 and also to an AND gate 73. The output data of this AND gate 73 are inputted to the ping-pong transmission circuit 53 as the B2-channel up-stream communication data PHI2. Further, the B2-channel down-stream data PHO2 from the ping-pong transmission circuit 53 are applied to an input terminal B of a selector 75. The output data of the selector 75 are received by the personal computer 5 via the SD line 79.

The AND gate 73 and the selector 75 are controlled in response to a mode signal MODE of high/low ("H"/"L") level transmitted by a data communication control microprocessor 77. In more detail, the mode signal MODE is kept at "H" level during data communication to open the AND gate 73 and to allow the selector 75 to select an input terminal B. Therefore, the data SD transmitted from the personal computer 5 become the B2-channel up-stream communication data PHI2, and the B2-channel down-stream communication data PHO2 become the data RD received by the personal computer 5. As a result, communication data can be transmitted between the personal computer 5 and the key service unit 1.

On the other hand, when outgoing and incoming call signals are controlled, the mode signal MODE is kept at "L" level to close the AND gate 73 and to allow the selector 75 to select an input terminal A.

To this terminal A, an output terminal 78 of the data communication control microprocessor 77 is connected to output control data to the personal computer 5. Therefore, the data SD transmitted by the personal computer 5 are transmitted to only the data communication control microprocessor 77 (without being transmitted to the B-channel), and only the control data outputted by the data communication control microprocessor 77 are received by the personal computer 5 as data RD. As a result, control data can be transmitted between the personal computer 5 and the data communication control microprocessor 77. When the control data are being transmitted, the communication data are blocked (not transmitted).

Figure 6:
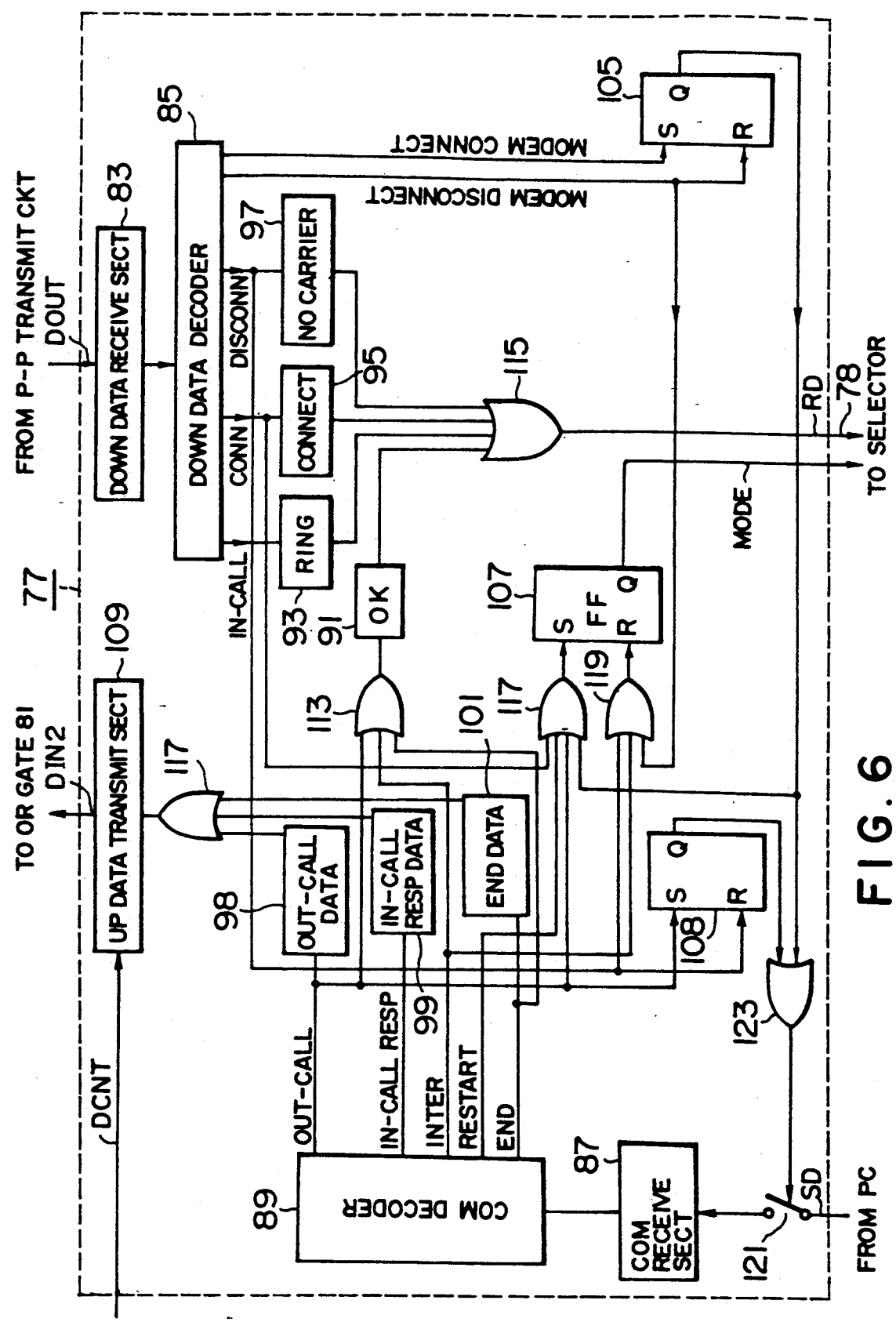
FIG. 6 is a block diagram showing a microprocessor for controlling data communications, which is provided in the data terminal unit interface shown in FIG. 3.

FIG. 6 shows the internal configuration of the data communication control microprocessor 77. The microprocessor 77 includes a down-stream data receiving section 83, a down-stream data decoder 85, a command receiving section 87, a command decoder 89, various result code generating sections 91, 93, 95 and 97, various up-stream data generating sections 98, 99 and 101, flip-flops 105, 107 and 108, and an up-stream data transmitting section 109.

The down-stream data receiving section 83 receives the D-channel down-stream data DOUT from the ping-pong transmission circuit 53, extracts control data for the data communication control microprocessor 77 therefrom, and transmits the extracted control data to the down-stream data decoder 85. The down-stream data decoder 85 decodes the received down-stream control data. These down-stream data are an incoming call signal data indicative of an incoming call, a connection data indicative of connection to another extension telephone set via the time switch 17, a disconnection data indicative of disconnection from the extension telephone set, a modem connection data indicative of connection to the modem via the time switch 17, and a modem disconnection data indicative of disconnection from the modem. If the decoded data is the incoming call data, a ring generating section 93 is activated; if the connection data, a connect generating section 95 is activated; if the disconnection data, a no-carrier generating section 97 is activated, respectively, so that result codes of RING, CONNECT, NO CARRIER are outputted by the generating sections, respectively. Further, if the modem connection data is decoded, the flip-flop 105 is set; and if the modem disconnection data is decoded, the flip-flop 105 is reset, when this flip-flop 105 is kept set, since the switch 121 is kept open, the data SD transmitted by the personal computer 5 are not inputted to the command receiving section 87.

The command receiving section 87 receives the data SD transmitted by the personal computer 5, extracts control commands (referred to as "AT commands", in general) from the data stream, and transmits the extracted data to the command decoder 89. The command decoder 89 decodes the transmitted control commands These control commands are an outgoing call command to generate an outgoing call, an incoming call command to generate an incoming call, an interrupt command to interrupt data communication, a restart command to restart interrupted data communication, and an end command to end data communication. If the decoded command is an outgoing call command, an outgoing call data generating section 98 is activated to output an outgoing call data; if an incoming call response command, an incoming call response data generating section 99 is activated to output an incoming call response data; and if an end command, an end data generating section 101 is activated to output an end data. These data are outputted by the up-stream data transmitting section 109 as the second D-channel up-stream data DIN 2.

Further, the outgoing call command, the interrupt command or the end command is decoded, an OK generating section 91 is activated to output a result code OK. This result code OK and the aforementioned other result codes RING, CONNECT and NO CARRIER are all transmitted to the input terminal A of the selector 75 via an OR gate 115 and then received by the personal computer 5.

The flip-flop 107 generates a mode signal MODE. When the connection data, the outgoing call command or the restart command is decoded or when the flip-flop 105 is set, this flip-flop 107 is set to generate an H-level mode signal MODE. On the other hand, when the disconnection data, the modem disconnection data or the interrupt command is decoded, this flip-flop 107 is reset to generate an L-level mode signal MODE.

The flip-flop 108 is set in response to an outgoing call command and reset in response to the connection data. When this flip-flop 108 is being set, the switch 121 is turned off, so that the data SD transmitted by the personal computer 5 are not inputted to the command receiving section 87.

The microprocessor 77 has three operation modes of control mode, connection standby mode and communication mode. In the control and connection standby modes, the mode signal MODE changes to L-level, so that the personal computer 5 is disconnected from the B2-channel. Further, in the connection standby mode, since the flip-flop 108 is set and the switch 121 is turned off, control commands transmitted by the personal computer 5 are not received. On the other hand, in the communication mode, since the mode signal MODE changes to H-level, the personal computer 5 is connected to the B2-channel.

Further, there exists a modem direct connection mode as a special state of speed modes. In this mode, the flip-flop 105 is set to open the switch 12.

To the up-stream data transmitting section 109, D-channel control signals DCNT from the telephone set control microprocessor 55 are applied. Only when this control signal DCNT is at L-level (i.e. the first D-channel up-stream data DIN 1 are not outputted from the telephone set control microprocessor 55), the up-stream data transmitting section 109 outputs the second D-channel up-stream data DIN 2. Both the first and second D-channel up-stream data DIN 1 and DIN 2 are inputted to the ping-pong transmission circuit 53 via the OR gate 81 as the D-channel up-stream data DIN 1. The control operation of the D-channel control signal DCNT prevents the first and second D-channel up-stream data DIN 1 and 2 from interfering with each other.

With reference to FIG. 3, voltage supply circuits 123 and 125 provided in the KSU interface unit 23 and the data terminal interface unit 27 convert a dc voltage (e.g. 24 V) supplied via a signal line 57 into another dc voltage (e.g. 5 V) to supply it to both the interface units 23 and 27.

With reference to FIGS. 2A-2C again, the configuration of the control unit 19 of the key service unit 1 will be described in detail hereinbelow.

The PC state control unit 41 receives D-channel control data transmitted from each DKT interface unit 11. In practice, the control data are data indicative of active/inactive state of each personal computer 5 transmitted from each data terminal interface unit 27 and various control commands transmitted from each personal computer 5. These received control data are inputted to a command/PC No. separating section 133 via a data buffer 131 to separate the control data from an identification number (referred to as PC No.) of the corresponding personal computer (which is attached to the control data as a header). The control data (command) are inputted to a command decoder 135, and the PC No. is inputted to the command decoder 135 and a PC No./data composition section 137.

The command decoder 135 decodes the inputted command to detect a change in state of each personal computer (i.e. change from active to inactive or vice versa, idle (standby) state in active state, incoming call state, change in mutual communication state, etc.). The changed state of each personal computer is written in a PC state register 139. Therefore, the PC state register 139 can store the updated state of each personal computer (i.e. active or inactive, idle in active state, incoming call state, communication state, etc.) for each PC number.

The command decoder 135 is provided with plural output lines one to one corresponding to the above-mentioned state change, so that a trigger pulse is outputted via each line corresponding to each decoded result. In this case, where the decoded state change is an idle state in active state, an incoming call state or a mutual communication state, each corresponding response code data is read in response to each corresponding trigger pulse, and then inputted to the PC No./data composition section 137 via a response code data buffer 143. The PC No./data composition section 137 attaches a PC No. transmitted by the command/PC No. separating section 133 to the response code data as a header and then transmits the data to the bus 21.

Further, all the trigger pulses outputted from the command decoder 135 are inputted to an OR gate 145 irrespective of the detected state change, and then applied to a PC state checking section 149 in an idle PC searching unit $5_1$, as PC state change detection signals. In response to these PC state change detection signal, the PC state checking section 149 checks the PC state, as described later in further detail.

A modem state control unit 43 receives control data from the modem interface unit 15. The received control data are inputted to a command/code decoder 153 via a command/code buffer $15_1$. The command/code decoder 153 decodes the inputted control data to detect the state of modem (i.e. standby state, incoming call state, communication state, etc.), and transmits a data indicative of the detected state to a comparator 155 and a modem state buffer 157. The comparator 155 compares the modem state data already stored in a modem state register 159 with that transmitted from the command/code decoder 153, and outputs a trigger pulse when both the data mismatch with each other. In response to this trigger pulse, the modem state buffer 157 writes the held modem state data in the modem state register 159, so that it is possible to store an updated modem state in the modem state register 159.

In the case of mismatch of the compared result (i.e. the modem state has been changed), the trigger pulse generated by the comparator 155 is also applied to a modem state checking section 161 of the idle PC searching unit 51. In response to the trigger pulse, the modem state checking section 161 reads the data from the modem state register 159 in the modem state control unit 43 to check the current modem state. As a checked result, if the modem is in standby state, the modem state checking section 161 gives a standby state return pulse to the PC state checking section 149 and further applies an H-level logical signal to one input terminal of an AND gate 163. In response to the standby state return pulse, the PC state checking section 149 checks the PC state as described later, in the same way as when the aforementioned PC state change detection signal is received.

An output signal of the PC state checking section 149 is applied to the other input terminal of the AND gate 163. As described above, the PC state checking section 149 checks the state of each personal computer, whenever the modem state is returned to a standby state from other states or whenever the state of either one of the personal computers changes. The above-mentioned check is executed as follows:

First, the PC state checking section 149 outputs a search pulse to the AND gate 163. This search pulse is applied to a priority encoder 165 via the AND gate 163 only when the modem 9 is in standby state and therefore the output signal of the modem state checking section 161 is at H-level. In response to the search pulse, the priority encoder 165 reads a data from a priority table 167 in which the priority order of predetermined responsive personal computers is stored together with the PC Nos. In response to a first search pulse, the priority encoder 165 reads a PC No. with the highest priority. The read PC No. is written in a response PC No. register 169 as a temporary response PC No. and further given to the PC state checking section 149. Then, the PC state checking section 149 transmits the temporary responsive PC No. to a PC state inquiry section 147 in the PC state control unit 41. The PC state inquiry section 147 gives the received temporary responsive PC No. to the PC state register 139 to read the corresponding PC state data, and returns the read PC state data to the PC state checking section 149.

The PC state checking section 149 checks the returned PC state data. If the PC state is not in active and idle (standby) state, the PC state checking section 149 outputs a search pulse again. In response to the search pulse, the priority encoder 165 reads a PC No. with the second higher priority, and checks the state of PC of the read PC No. in the same way as described above.

As described above, the PC states are repeatedly checked in the order of priority. During the PC No. checking process, if a personal computer of active and further idle state is found, the PC state checking section 149 selects this personal computer as a responsive PC (which can respond), and stops outputting further searching pulses. Instead, the PC state checking section 149 transmits a check end signal to the priority encoder 165. In response to the check end signal, the priority encoder 165 outputs a time switch control data and a modem connection data each including a PC No. of the finally read or selected responsive PC. The time switch control data is transmitted to the time switch controller 47. In response to the control data, the time switch controller 47 controls the time switch 17 so that a communication path between the modem 9 and the selected responsive PC can be connected. Further, the modem connection data is received by the DKT interface unit 11 corresponding to the selected responsive PC, and further transmitted to the data terminal interface unit 27.

Figure 7:
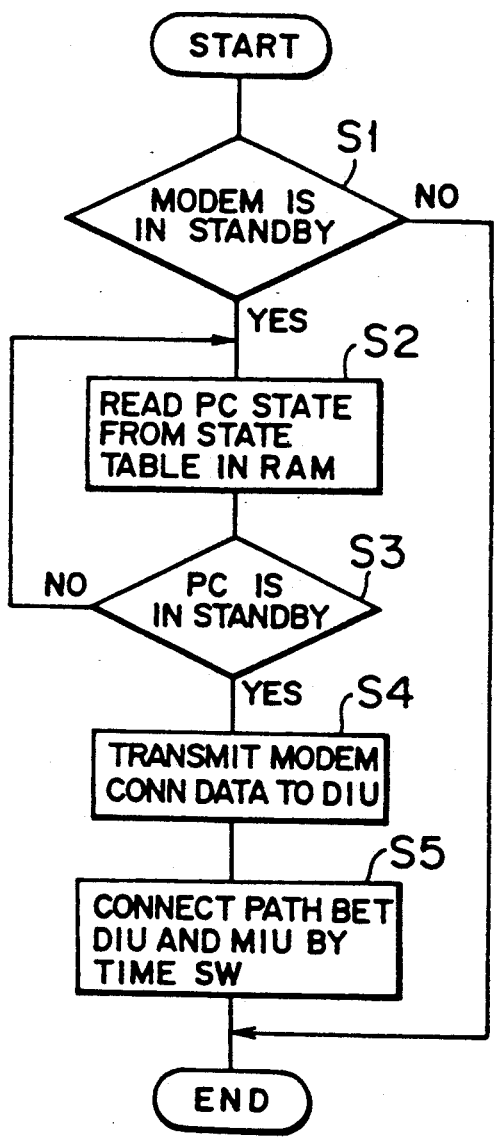
FIG. 7 is a flowchart for assistance in explaining the responsive PC selecting processing executed by the control unit shown in FIG. 2.
Figures 8, 8A, 8B:
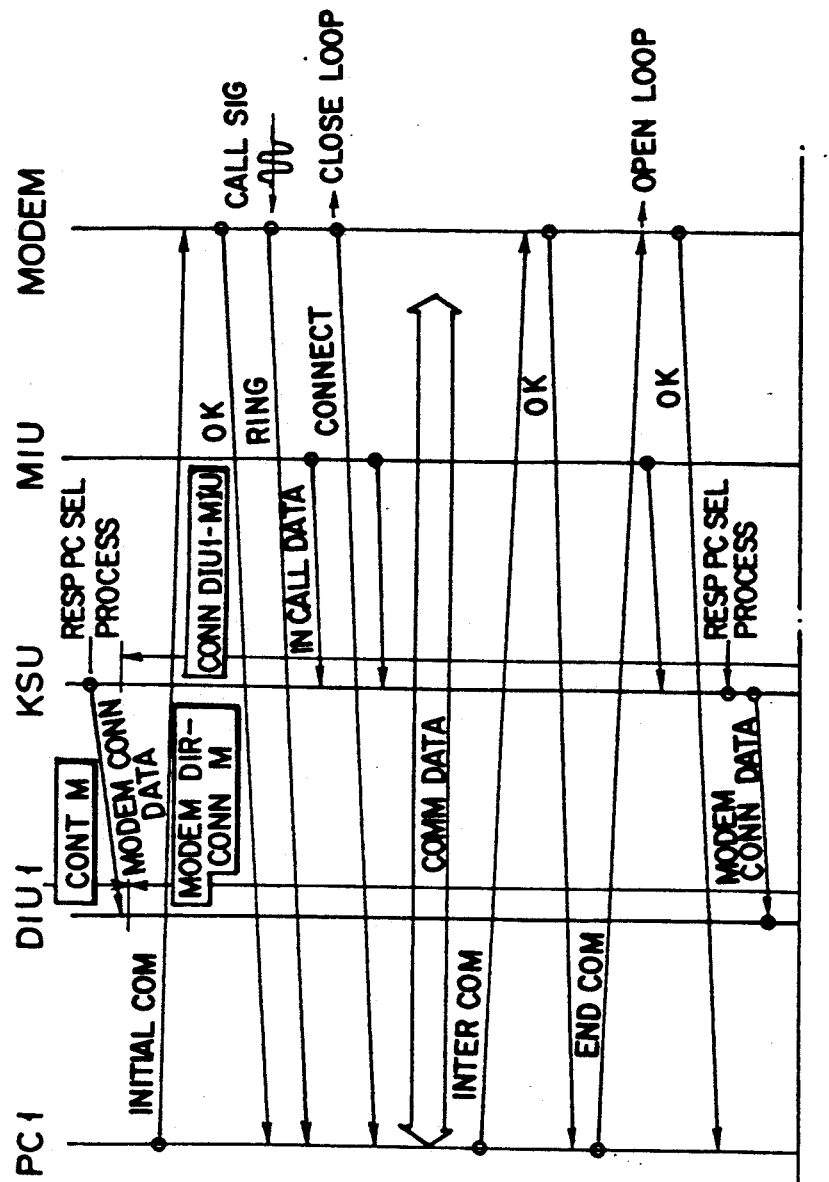
FIGS. 8A-8B are sequence diagrams, for assistance in explaining the operation sequence of the embodiment shown in FIG. 1.
Figure 8B:
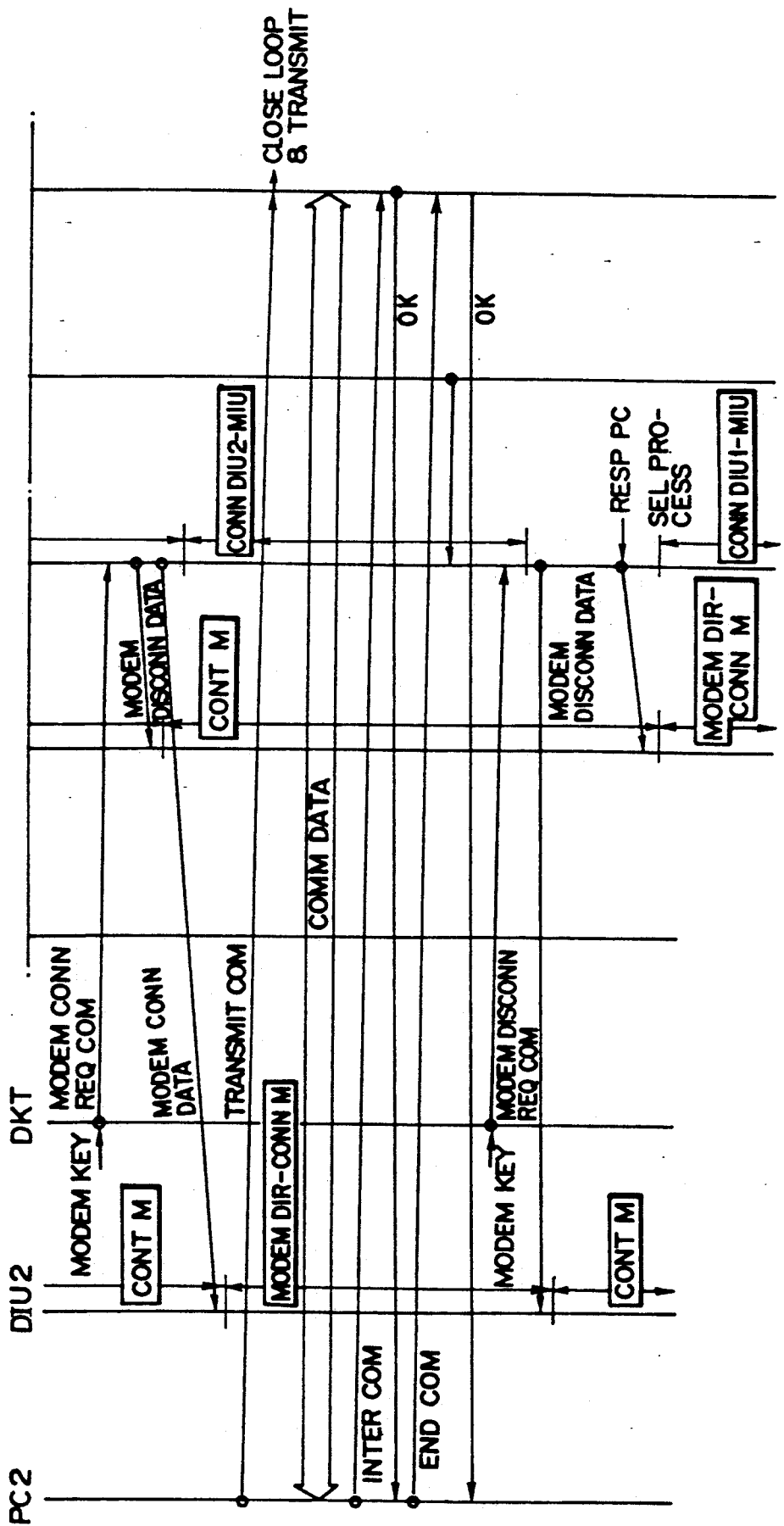

With reference to FIGS. 7 and 8A-8B, the operation of the key telephone system configured as described above will be described hereinbelow.

FIG. 7 is a flowchart for assistance in explaining the process for selecting a responsive PC, which is executed by the idle PC search unit $5_1$ of the control unit 19.

The idle PC search unit 51 checks the state of modem 9 with reference to the state register 159 in the modem state control unit 43, whenever the state of the modem 9 changes (in step S1). When the state of the modem 9 returns from other states to the standby state or when the state of either one of personal computers changes in the modem standby state, the search unit 51 reads the state data of each personal computer $5_1$ to $5_n$ from the state register 139 in the PC state control unit 41 (in step S2). The state data are read in the order of priority previously determined in the priority table 167.

The searching unit 51 reads the state data of a personal computer with the highest priority, checks whether the read personal computer is in standby state or not (in step S3). When the personal computer is in speech or incoming-call state (irrespective of the active or inactive state), the recorded state of another personal computer with the second higher priority is read and checked in the same way. As described above, the PC searching unit $5_1$ finds a personal computer with the highest priority order and in active and further standby state, by checking the state of each personal computer in the order of priority.

If a personal computer satisfying the above conditions can be found, the searching unit 51 proceeds to step S4 in order to select the found personal computer as a responsive PC. That is, the idle PC searching unit 51 transmits a modem connection data to the data terminal interface unit 27 of the newly selected responsive PC (in step S4), and further transmits control data including the PC No. of the newly selected PC to the time switch controller 47. In response to the transmitted control data, the time switch controller 47 controls the time switch 17 to connect a communication path between the selected personal computer and the modem 9 (in step S5), thus the processing of selecting the responsive PC being completed.

As described above, when the modem 9 is in standby state, a personal computer with the highest priority order can be selected from personal computers (which are in active and standby state) as a responsive PC. The communication path between the responsive PC and the modem 9 is previously kept connected. By the way, the priority order on which the responsive PC is selected can be determined or changed freely by the user, by inputting a specific command through a key switch of the key telephone set 3, for instance. In response to the command, the priority encoder 16 in the control unit 19 rewrites the priority table 167. Here, various modes of setting priority order can be considered. For example, when n pieces of personal computers are connected to the telephone system, it is possible to provide priority orders to all the personal computers from 1st to n-th or to provide priority orders to specific m pieces of personal computers, without providing no priority orders to the remaining (n−m) personal computers. In the former case, all the n personal computers can be selected as the responsive PC; however, in the later case, only the m personal computers can be selected as the responsive PC. Further, it is also possible to provide the same priority data to a plurality of personal computers. In this case, the responsive PC can be selected in the order of extension telephone numbers (previously registered in the RAM 49) from among the personal computers with the same priority order.

FIGS. 8A-8B show the sequence of an incoming call, a response to the modem 9 and an outgoing call from the modem 9.

With reference to FIGS. 8A-8B, when a personal computer in standby state (referred to as PC1) is selected as the responsive PC, the modem connection data is transmitted from the key service unit (referred to as KSU) to the data terminal interface unit 27 (referred to as DIU 1) of the PC1. Although being ordinarily set to the control mode in standby state, the DIU 1 is set to modem direct connection mode in response to the modem connection data. This modem direct connection mode is maintained until the flip-flop 105 is reset so that a modem disconnection data is received. On the other hand, in the KSU, the time switch 17 connects a path between the modem interface unit 15 (referred to as MIU) and the DIU 1, so that a state equivalent to that the PC1 and the MODEM 9 are directly connected via the RS-232C interface can be obtained. Further, in the direct connection equivalent state, the MIU always monitors data SD and RD transmitted between the PC1 and the modem 9, and transmits the corresponding control data to the control unit 19 in the KSU, whenever operation such as incoming call, response, speech end, etc. changes. Further, the DIU 1 always monitors down-stream control data transmitted by the KSU 1, and is returned from the modem connection mode to the control mode in response to the modem disconnection data as described above.

Once the above-mentioned direct connection equivalent state is formed, the PC1 first transmits an initial command including information to be initialized (e.g. data speed) to the modem 9. After the modem 9 has been initialized in accordance with the initial command, the modem 9 returns a result code OK indicative of command execution end to the PC1. As described above, the preparation that the PC1 can communicate with the office line 7₂ via the modem 9 has been completed.

When an incoming call signal arrives at the modem 9 via the office line 7₂, the modem 9 transmits a result code RING indicative of an incoming call to the PC1. At this time, the MIU detects the result code RING, and transmits an incoming call data to the control unit 19 of the KSU. In response to the incoming call data, the modem state control unit 43 in the control unit 19 rewrites the state data of the modem 9 in the RAM 49 from the standby state to the incoming call state.

The modem 9 counts the number of incoming call signal arrivals, and automatically responds to the incoming call when the counted value reaches a predetermined number (e.g. 2), so that a dc loop is closed. At the same time, the modem 9 transmits a result code CONNECT indicative of data communication state to the PC1. At this time, the MIU detects the result code CONNECT and transmits a connection data to the control unit 19 of the KSU. In response to the connection data, the modem state control unit 43 in the control unit 19 rewrites the state data of the modem 9 in the RAM 49 from incoming call state to data communication state.

Once the modem 9 changes to the data communication state as described above, communication data are immediately inputted from the office line 7₂ to the modem 9. In this case, since the path between the modem 9 and the PC1 has kept in the direct connection equivalent state, the PC1 can receive all the communication data from the office line 7₂ beginning from the head thereof.

To end the data communication, an interrupt command is transmitted from the PC1. This interrupt command is received by the modem 9. The modem 9 returns a result code OK to the PC1, and then the PC1 transmits an end command. In response to the end command, the modem 9 opens the dc loop to return to the standby state, and then returns a result code OK to the PC1. The MIU detects this result code OK and transmits a corresponding data to the control unit 19 of the KSU. In response to the control data, the modem state control unit 43 of the control unit 19 rewrites the state data of the modem 9 in the RAM 49 from the data communication state to the standby state.

Once the state data of the modem 9 returns to the standby state as described above, the processing of selecting a responsive PC (explained with reference to FIG. 7) is executed again. In this case, if the current responsive PC1 is in active and further standby state and has a priority order higher than those of other personal computers being in standby state, the PC1 is selected again as the responsive PC. In other words, the direct connection equivalent state between the PC1 and the modem 9 is maintained.

Under these conditions, when a personal computer (referred to as PC2) other than the PC1 transmits an outgoing call to the office line 7₂, the following operation is executed:

First, in the digital key telephone set 3 (referred to as DKT) connected to the PC2, a modem request key (referred to as modem key) for requesting the DKT to be connected to the modem 9 of various function keys arranged on a front panel of the DKT is depressed, a modem connection request command is transmitted from the telephone set control microprocessor 55 in the DKT to the control unit 19 in the KSU via the D-channel. In response to this command, the PC state control unit 41 of the control unit 19 transmits a modem disconnection data to the DIU 1 of the responsive PC1, and further a modem connection data to the data terminal interface unit 27 (referred to as DIN 2) of the PC2. Further, the time switch controller 47 controls the time switch 17 to disconnect a path between the DIU 1 and the MIU and connect a path between the DIU 2 and the MIU 2.

In response to the modem disconnection data, the DIU 1 is switched from the modem direct-connection mode to the control mode, because the flip-flop shown in FIG. 6 is reset. On the other hand, in response to the modem connection data, the DIU 2 is switched from the control mode to the modem direct-connection mode, with the result that a direct-contact equivalent state can be formed between the PC2 and the modem 9.

Once this state has been formed, the PC2 transmits an outgoing call command including a telephone number data to be called to the modem 9. In response to this command, the modem 9 transmits an outgoing call to the office line 7₂. Therefore, if the called side responds thereto, data communication starts.

The operation of ending the data communication is the same as that of the PC1 already explained In this case, a modem key is further depressed again in the DKT. Then, a modem disconnection request command is transmitted from the telephone set control microprocessor 55 in the DKT to the control unit 19 in the KSU. In response to this command, the control unit 19 controls the time switch 17 to disconnect a path between the DIU 2 and the MIU, and transmits the modem disconnection data to the DIU 2 and further the end command to the MIU.

In response to the modem disconnection data, the DIU 2 is switched from the modem direct-contact mode to the control mode, so that the PC2 returns to the standby state. Further, in response to the end command, the MIU transmits this end command to the modem 9, so that the modem 9 returns to the standby state.

As described above, once the modem 9 returns to the standby state, the processing of selecting a responsive PC is executed again. In this case, if the PC1 is in active and standby state and has a priority order higher than those of other personal computers being now in standby state, the PC1 is selected again as the responsive PC, so that the PC1 is connected to the modem 9.

Thereafter, where the responsive PC1 starts data communication with other extension telephone sets or where the power supply is turned off and therefore the PC1 becomes inactive, the processing of selecting a responsive PC is executed again. In this case, the PC1 loses the position of the responsive PC, so that another responsive PC having the highest priority is selected as a new responsive PC from among other personal computers being in active and standby state.

An embodiment of the present invention has been described by way of example. Without being limited thereto, however, it is understood that the present disclosure can be changed in various ways without departing from the gist thereof. For example, it is possible to select single or plural responsive PCs whenever the system has been turned on, without selecting responsive PCs thereafter, in such a way that the PC or PCs first selected are fixedly used. Or else, it is possible to select the responsive PC at predetermined time intervals when the modem is in a standby state. Further, the present invention is applicable to various communication systems such as PBX (private branchexchange) system, home telephone system, etc. Further, even when ISDN (integrated service digital network) signals arrive at the office line 7₁, since the DKT interface unit 11 can process (2B+D) signals, the ISDN signals can be transmitted to the personal computer for signal processing. Further, ISDN signals can be processed in other time division modes, without being limited to only the (2B+D) time division mode.

What is claimed is:

1. A modem pooling system for enabling selective connection of a plurality of data terminal units to a modem through exchange service circuitry, said modem pooling system comprising:
   modem state detecting means for detecting a standby state of said modem;
   selecting means for selecting at last one of said plurality of data terminal units as a responsive data terminal unit; and
   exchange service control means for controlling said exchange service circuitry so that said modem is continuously connected to said responsive data terminal unit by said selecting means while said modem state detecting means is detecting that said modem is in a standby state.

2. The modem pooling system of claim 1, wherein said selecting means selects said responsive data terminal unit in accordance with a predetermined priority order.

3. A method of controlling exchange service in a modem pooling system for enabling selective connection of a plurality of data terminal units to a modem through exchange service circuitry, comprising the steps of:
   detecting a standby state of said modem;
   detecting whether or not each of said plurality of data terminal units is in a standby state;
   selecting as a responsive data terminal unit, at least one of said plurality of data terminal units detected as being in a standby state; and
   continuously connecting said modem to said responsive data terminal unit while said modem is detected as being in a standby state.

4. A modem pooling system for enabling selective connection of a plurality of data terminal units to a modem through exchange service circuitry, said modem pooling system comprising:
   modem state detecting means for detecting a standby state of said modem;
   data terminal state detecting means for detecting whether each of said plurality of data terminal units is in a standby state;
   selecting means for selecting, as a responsive data terminal unit, at least one of said plurality of data terminal units detected as being in a standby state by said data terminal state detecting means; and
   exchange service control means for controlling said exchange service circuitry so that said modem is continuously connected to said responsible data terminal unit while said modem state detecting means is detecting that said modem is in a standby state.

5. The modem pooling system of claim 4, wherein said selecting means comprises means for scanning, in accordance with a predetermined priority order, a state of each of said plurality of data terminal units detected by said data terminal state detecting means, thereby selecting at least one of said plurality of data terminal units detected as being in a standby state as said responsive data terminal unit.

* * * * *